United States Patent [19]

Ragen

[11] 4,318,651
[45] Mar. 9, 1982

[54] FASTENER FOR BLIND HOLES

[76] Inventor: Peter D. Ragen, 921 S. 102nd St., West Allis, Wis. 53214

[21] Appl. No.: 138,465

[22] Filed: Apr. 8, 1980

[51] Int. Cl.[3] ............................................. F16B 35/04
[52] U.S. Cl. .................................... 411/342; 411/392
[58] Field of Search ................. 85/3 R, 3 S, 3 K, 1 F, 85/80; 248/546; 411/342, 341, 340, 392

[56] References Cited

U.S. PATENT DOCUMENTS

| 2,203,146 | 6/1940 | Hexdall | 85/3 K |
| 4,047,462 | 9/1977 | Hurtig | 85/3 R |
| 4,196,883 | 4/1980 | Einhorn et al. | 85/3 R X |

FOREIGN PATENT DOCUMENTS

| 606902 | 8/1948 | United Kingdom | 85/1 F |
| 1187837 | 4/1970 | United Kingdom | 85/3 S |

Primary Examiner—Ramon S. Britts

Attorney, Agent, or Firm—Wheeler, House, Fuller & Hohenfeldt

[57] ABSTRACT

A fastener for use in plaster walls, ceilings, and the like to support a lamp or plant, includes a conventional screw of uniform diameter, a spring threaded over the screw, and a toggle with a screw threaded hole of large enough diameter to be threaded over the outer surface of the spring. The screw may be capable of engaging the threads in the toggle plate, although the diameter must be small enough so that the spring may be received between the threads of the lag screw and the threads of the hole in the toggle plate. The screw may be a lag screw, a machine screw thread, etc. The screw shank is full-sized, not reduced to receive the helical spring. The spring serves to connect the screw and the toggle plate by being threaded partially one into the other and has the capability of being bent resiliently so that toggle and screw are parallel to each other for insertion into a blind hole, after which the toggle springs back into position and the assembly is screwed together. The spring may be a plastic tube.

7 Claims, 12 Drawing Figures

U.S. Patent      Mar. 9, 1982      4,318,651
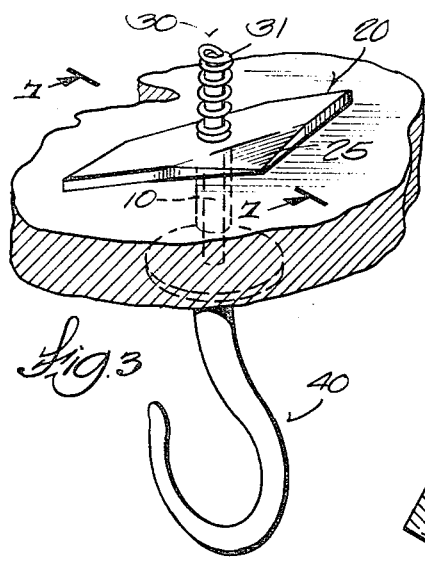
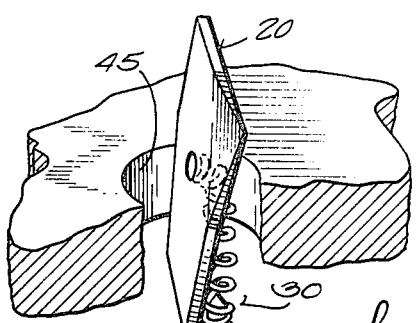
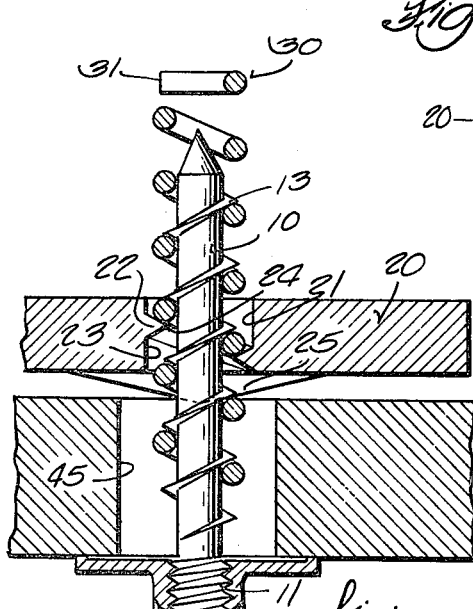
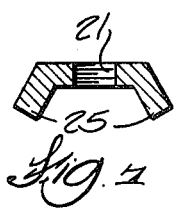
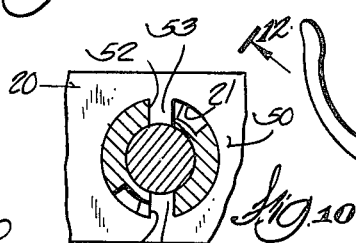
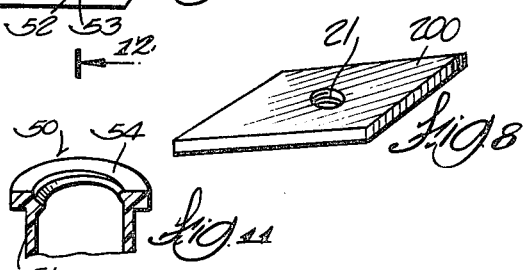
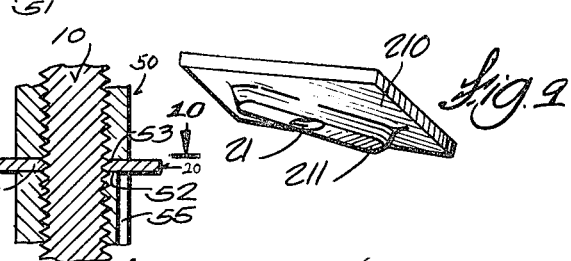
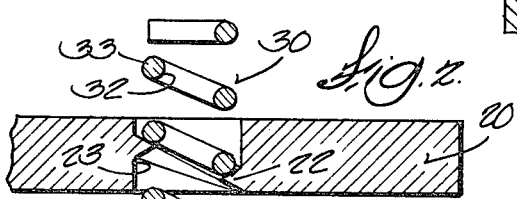
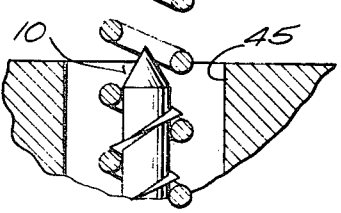
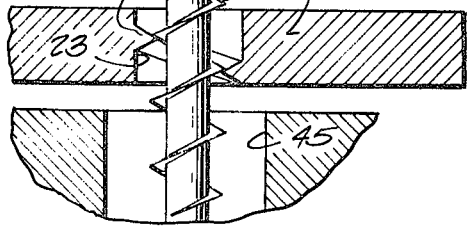

FASTENER FOR BLIND HOLES

BACKGROUND OF THE INVENTION

It is known to use a helical spring to connect a toggle member to a screw by turning the end of the screw to reduced size to mount a spring whose outer diameter matches the crest of the screw thread so that the turns of the outer diameter of the helical spring are extensions of the screw thread. Also, Leitner U.S. Pat. No. 3,175,452 attaches a flexible part of reduced diameter to which a toggle nut is connected, to the end of a screw which is to be inserted in a blind hole and later hopefully turns the toggle onto the reduced part and juggles it onto the screw. German Pat. No. 1,045,984 is similar. In practice it is exceedingly difficult to thread the screw into the nut after the nut has been inserted into a blind hole. A reduced diameter flexible portion gives no purchase on the threads of the nut to draw it toward the screw. The screw should be pushed toward the nut while turning but cannot be. Italian Pat. No. 483,279 shows a reduced diameter hook shaped member on the end of the screw and a separate pull cord which is supposed to provide the purchase to permit screwing the screw into the toggle member. Again, that would be exceedingly difficult to accomplish in fact since the parts are not aligned. U.S. Pat. No. 3,782,238 appears to involve a portion of a bolt turned to reduced diameter and bent to receive a toggle member similar to the Italian patent. The toggle cannot be engaged on the main bolt thread until after insertion in the hole. Threading then is difficult because the toggle is inaccessible.

In no case is an unmodified screw known to be used with a standard helical spring to engage a non-complementary hole in a unitary toggle member that is oversized to the threads of the screw but large enough to receive the spring as an intermediate member overlapping between the screw threads and the threads of the toggle hole.

SUMMARY OF THE INVENTION

My invention consists of a novel form of toggle screw or bolt for use in a blind hole in a ceiling or wall such as a plaster wall to receive a fitting such as a ceiling hook or the like.

This toggle can be used with a machine screw thread or lag screw thread by changing the pitch of the spring. The purpose of being able to use a lag screw with a sharp point is that the screw can also be used for insertion into a blind hole with the toggle, or used as a fastener into wood without the toggle. This eliminates a machined screw stud which is an integral part in giving the assembler the option of assembling into a blind hole or wood.

As used in this application the word spring denotes a resilient member, not necessarily metal, used to connect the toggle to a bolt or screw such as a lag screw. The term screw unless otherwise defined refers to a lag screw, screw, bolt or other threaded fastener. The intermediate member is a part intermediate in diameter between the hole in a toggle and the outside diameter of a screw.

The most novel part of my device is that it comprises a unitary toggle with a hole too large to be complementary to the standard screw such as a lag screw or machine bolt which is used with the toggle. The lag screw or machine bolt is sufficiently smaller than the threaded hole in the toggle so that an intermediate member comprising a spring with inner and outer diameters respectively overlapping those of the threaded crests of the bolt and the toggle may be interposed between the screw and the hole in the toggle. The spring does not require a socket, or any mounting on the screw. It may simply be threaded onto the outside diameter of any standard screw or bolt without other fastenings. The hole in the toggle need not have a complete thread of any defined pitch, but may include a partial thread to accommodate a variety of screw types with a single toggle. The intermediate helical spring can vary its pitch as needed, or in the last embodiment may be a spring without helical coils made of plastic. Not only is such a device easier to produce, but it is simple to bend the free end of the spring near where it is engaged with the toggle to insert the toggle into a blind hole after which the toggle naturally springs into its desired position behind the hole. Simply by turning the screw, the spring is threaded further into the toggle and the screw into the spring until the screw and spring are both sufficiently threaded into the hole in the toggle, producing a firm support for a hook or other attachment. Unlike other devices of this character the toggle begins by being threaded onto the spring or intermediate member before insertion and does not have to be engaged later as it would if it were complementary with the screw. Preferably the ends of the spring are bent to capture the toggle, so the spring does not escape the toggle. The toggle itself may be strengthened with a boss or provided with bent flanges for strength and to prevent turning.

One of the virtues of my device is that the thread on the screw need not be of the same pitch as the thread in the toggle but may have partial threads engageable with a range of threaded fasteners. The dimensions and pitch are not particularly critical since the threaded hole in the toggle is not intended to be complementary to the thread of the screw but must be considerably larger, with the intermediate member or spring being sized to make up the difference. When the screw is taken up against the outside of a surface, pulling the toggle against the inside, the connection becomes firm and stable with the thread crest in the toggle hole overlapping the outer diameter of the intermediate spring member and the thread crest of the screw overlapping the inner diameter of the spring.

Desirable variations include a toggle having at least one point so that it may be used to bore the required hole, a toggle having bent sides for strength and to engage the rear surface of the wall to prevent turning of the toggle as the connection is tightened, and a toggle having a boss in the center for stiffness. The spring may be helical or a resilient plastic tube and may have an end shaped to prevent parts separating. Other variations may be made within the scope of my invention which is defined by the attached claims.

DRAWINGS

FIG. 1 is a cross-sectional view showing my invention installed in a hole.

FIG. 2 is a view similar to FIG. 1 in which the parts of my invention are shown before they are tightened into final position.

FIG. 3 is a broken away perspective view of a section of wall showing a hook installed therein using my invention.

FIG. 4 is a view similar to FIG. 3 showing my invention being inserted in a blind hole in a wall.

FIG. 5 is a view similar to FIG. 2, showing the manner in which the threads of a lag screw used in my invention may be sized to be secure in the special non-complementary threads of my toggle even when the intermediate spring is not engaged between them.

FIG. 6 is a fragmentary cross-sectional view through the threads of a machine screw, a helical spring, and the toggle of my invention, showing the manner in which a machine screw having a thread crest diameter smaller than the interior thread crest diameter of the thread in the toggle may be used with my intermediate helical spring connected to overlap both thread crest diameters to form a secure connection. Other views would be like FIGS. 1–5 except for the thread form.

FIG. 7 is a cross-sectional view on line 7—7 of FIG. 3 showing only the toggle.

FIG. 8 is a perspective view of my toggle.

FIG. 9 is a perspective view of my toggle with an optional boss around the hole for the intermediate spring member.

FIG. 10 is a view on line 10—10 of FIG. 12 showing a modification of my device.

FIG. 11 is a fragmentary perspective view of the intermediate member of FIG. 10 broken away on a diameter.

FIG. 12 is a cross sectional view on line 12—12 of FIG. 10.

DETAILED DESCRIPTION

Although the disclosure hereof is detailed and exact to enable those skilled in the art to practice the invention, the physical embodiments herein disclosed merely exemplify the invention which may be embodied in other specific structure. While the best known embodiment has been described, the details may be changed without departing from the invention, which is defined by the claims.

As shown in FIGS. 1 through 5 my invention includes a screw 10 which may preferably (but not necessarily) be a standard screw of the type now used with swag hooks and the like, having a machine screw thread 11 to engage in a complementary hole in a swag hook 12 and a lag screw thread 13 to engage a wall, a ceiling, or other surface. Usually the screw or bolt has a uniform diameter except at the tip. Such a screw is spoken of as having a thread root diameter or shaft diameter of the dimension shown at lead line 10 and a larger crest diameter measured at 13, the difference being the height of the thread 13. Normally, such a screw 10 is received in a threaded hole or threaded opening which is complementary to the screw thread 13, either because it is forced into the opening as in the case of a lag screw screwed into wood, or because the opening is manufactured to be complementary as in the case of a nut. My invention departs from that, in that I provide a unitary or one-piece toggle 20 having a hole 21 provided with thread 22 whose root diameter at 23 is substantially larger than the crest diameter at 13 of screw 10 and whose crest 24 has a diameter larger than root diameter at 10 and close to the crest diameter 13 of screw 10. When the crest diameters overlap, as shown at FIG. 5, my toggle may be made to hold even though the spring slips out of the back of the toggle.

A helical intermediate spring 30, preferably having a portion 31 bent out of the pitch of the helix to secure toggle plate 20 from accidentally unscrewing from the spring is threaded into the toggle 20 on its outer surface engaging the projection 22 that serves as a thread or part of a thread. The spring may instead be staked or cemented in place rather than have it bent to secure it to the toggle. The inner surface of spring 30 is turned onto screw 10. The wire size of spring 30 and the inner and outer diameters 32, 33 of the helix are so chosen that the outside of the helix 33 overlaps the inside crest diameter (maximum inward projection) 24 of the thread 22 of the hole in the toggle plate 20 and the inner diameter 32 of the helix overlaps the outside crest diameter (maximum outward projection) 13 of the screw 10, so that the helical spring 30 forms an intermediate member connecting the screw 10 and the toggle plate 20.

As shown in FIG. 4 this permits the screw to be threaded part way into the spring and the spring to be threaded through the toggle plate before insertion into hole 45. This forms a flexible connection. There is neither any difficulty in getting the toggle plate to thread onto the screw, as in the case of the prior smaller connection, nor is there any necessity to make the helical spring a precise match for the screw threads, as in the case when the spring is the exact size of the screw, nor is there any need to turn down or otherwise make a special socket on the screw to receive the flexible part, as there would be in prior art designs.

As best shown in FIG. 4, the toggle construction of this application is exceedingly easy to use because the spring 30 is threadedly engaged both with the toggle and with the screw or bolt at the time when the toggle is being inserted into the hole. The user holds the toggle 20 against the screw or bolt 10 and inserts them into the hole with the spring 30 providing the necessary flexibility. As the user inserts the toggle in the hole it must be released but the hole itself keeps the toggle in line until it is behind the surface, at which time the resilience of the spring 30 swings toggle 20 to a position parallel with the back of the wall surface. By applying moderate pull to the lag screw, bolt, or the like, to hold the toggle 20 against the rear surface of the wall, it may then be tightened by rotating the screw or bolt.

As shown in FIG. 7, the toggle plate may preferably have bent corners 25, preferably in the short dimension, to strengthen it and prevent the toggle plate from turning as the connection is tightened by turning the screw. The long dimension is left straight to provide the longest bearing on the inside surface behind the hole. The toggle plate may also be flat as shown at toggle 200 in FIG. 8 or may have a center boss 211 as shown on toggle 210 in FIG. 9.

As shown in FIG. 6, the screw 10 has a machine thread but works like FIGS. 1–5. It is not necessary that the inside diameter of the crest 24 of the thread in the toggle plate 20 overlap the outside diameter 13 of the crest of the thread on the screw 10. A machine screw 10 like that shown in FIG. 6 may be used and the helical spring 30 may be relied upon entirely to provide the overlap required to make the threads hold. The crests 13 of the thread on the machine screw overlap the inner diameter 32 of the helical spring 30 and the turns of the helical spring 30 overlap the inner diameter 24 of the crests of the threads on the toggle plate 20 (shown here with multiple turns) to form a secure connection through the helical spring 30 as an intermediate member. The act of threading the parts together causes the pitch of the spring 30 to conform to the pitch of the screw 10 to form the necessary interlock between the parts and hold toggle 20 so that a fitting such as swag hook 40 on the outside of the surface in which the blind hole 45 is provided will be secure.

In FIGS. 10-12 a further embodiment is shown. It includes a resilient member 50 which is not a helical spring but is preferably a suitable plastic formed into a resilient sleeve 51. The sleeve 51 is provided with notches 52 or openings to receive partial threads comprising ears 53 extending radially inwardly from the perimeter of a hole 21 in the toggle 20 to serve as partial screw threads. As shown ears 53 and notches 52 are opposed, but three or four appropriately spaced sets might be provided. Preferably sleeve 50 has a flange 54. Before the toggle is used, the toggle is mounted to the plastic sleeve 50 as shown and the bolt or screw is inserted into the other end of the resilient plastic sleeve which has an internal diameter that gives it sufficient engagement with the screw thread so that the screw may be threaded into it using moderate torque. It is not initially screwed in sufficiently to engage the toggle. Thus, the portion of the tube 50 between the screw and the toggle serves as an intermediate member in the same manner as the helical spring, on which the toggle may be swiveled to a position parallel to the bolt or screw for insertion into a wall or ceiling opening, then placed in a position parallel to the back of the wall or ceiling after which the bolt or screw is rotated to thread through the plastic sleeve 50 and into engagement with the toggle to form a firmly anchored connection with the wall or further tightening. A hook or any other fitting may thus be secured to a wall or ceiling. If desired slots 55 extend along tube 50 for better bending characteristics. The plastic of sleeve 50 is preferably resilient like spring 30.

I claim:

1. In a toggle screw set, a screw having a thread, an intermediate member having an inside diameter less than the thread crest diameter of the screw and larger than the root diameter of the screw thread, said intermediate member having an outside diameter substantially greater than the crest diameter of the threads, and a unitary toggle having a hole provided with at least part of a thread larger than the screw thread to receive said screw and said intermediate member, the thread root diameter of the hole in the toggle being larger than the outer diameter of said intermediate member, and the crest diameter of the thread in the hole in the toggle being less than the outer diameter of the intermediate member and less than the thread crest diameter of the screw, said intermediate member extending axially respecting said screw and connecting the screw flexibly to the unitary toggle, and less than the thread crest diameter of the screw said screw and said intermediate member being screwed telescopically into the hole in the toggle.

2. The device of claim 1 in which the thread of the screw is of the lag screw type, the screw having a machine screw thread on the other end to receive a similarly threaded opening in a support means designed to support a weight.

3. The device of claim 1 in which the intermediate member is a helical spring and the free end of the spring is bent to prevent the toggle from unscrewing over it.

4. The device of claim 1 in which the hole in the toggle is non-complementary in diameter to the diameter of the screw.

5. The device of claim 1 in which the hole in the toggle is non-complementary to the pitch of the screw.

6. The device of claim 1 in which the toggle is provided with partial threads in the opening for the screw.

7. The device of claim 6 in which the intermediate member is a plastic sleeve provided with openings through which the partial threads of the toggle extend to between the thread crests of the screw.

* * * * *

UNITED STATES PATENT AND TRADEMARK OFFICE
CERTIFICATE OF CORRECTION

PATENT NO. : 4,318,651
DATED : March 9, 1982
INVENTOR(S) : Peter D. Ragen

It is certified that error appears in the above—identified patent and that said Letters Patent is hereby corrected as shown below:

Column 6, Claim 1, Lines 14 - 15, "and less than the thread crest diameter of the screw" should be deleted.

Signed and Sealed this

Sixth Day of July 1982

[SEAL]

Attest:

GERALD J. MOSSINGHOFF

Attesting Officer     Commissioner of Patents and Trademarks